US007188339B2

(12) United States Patent
Qureshi

(10) Patent No.: US 7,188,339 B2
(45) Date of Patent: Mar. 6, 2007

(54) ACPI PREPROCESSOR

(75) Inventor: Shiraz Ali Qureshi, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 575 days.

(21) Appl. No.: 10/693,510

(22) Filed: Oct. 24, 2003

(65) Prior Publication Data

US 2005/0091649 A1    Apr. 28, 2005

(51) Int. Cl.
    *G06F 9/45*    (2006.01)
(52) U.S. Cl. .................. 717/140; 717/114; 717/147
(58) Field of Classification Search ................ 717/140, 717/114, 147
    See application file for complete search history.

(56) References Cited

U.S. PATENT DOCUMENTS

| | | | | |
|---|---|---|---|---|
| 5,613,118 A * | 3/1997 | Heisch et al. | ................ | 717/158 |
| 6,063,133 A * | 5/2000 | Li et al. | ...................... | 717/136 |
| 6,106,575 A * | 8/2000 | Hardwick | ................... | 717/119 |
| 6,154,877 A * | 11/2000 | Ramkumar et al. | ......... | 717/114 |
| 6,161,219 A * | 12/2000 | Ramkumar et al. | ......... | 717/130 |
| 6,167,511 A * | 12/2000 | Lewis | ............................ | 713/2 |
| 6,292,822 B1 * | 9/2001 | Hardwick | ................... | 718/105 |
| 6,298,389 B1 * | 10/2001 | Gerhardt | ..................... | 719/313 |
| 6,341,368 B1 * | 1/2002 | Deans | ....................... | 717/100 |
| 6,442,533 B1 * | 8/2002 | Hinkle | ..................... | 705/36 R |
| 6,466,999 B1 * | 10/2002 | Sliger et al. | .................. | 710/68 |
| 6,477,683 B1 * | 11/2002 | Killian et al. | .................. | 716/1 |
| 6,499,102 B1 * | 12/2002 | Ewertz | .......................... | 713/1 |
| 6,516,461 B1 * | 2/2003 | Ichisugi | ....................... | 717/144 |
| 6,530,080 B2 * | 3/2003 | Fresko et al. | ............... | 717/166 |
| 6,574,790 B1 * | 6/2003 | Abramson et al. | .......... | 717/100 |
| 6,598,169 B1 * | 7/2003 | Warwick et al. | ............. | 713/320 |
| 6,634,022 B1 * | 10/2003 | Leermakers | ............... | 717/158 |
| 6,675,354 B1 * | 1/2004 | Claussen et al. | ............ | 715/513 |
| 6,763,472 B2 * | 7/2004 | Warwick et al. | ............. | 713/320 |
| 6,792,520 B2 * | 9/2004 | Qureshi et al. | ............. | 711/170 |
| 6,925,635 B2 * | 8/2005 | Garvey | ....................... | 717/143 |
| 6,976,119 B2 * | 12/2005 | Qureshi et al. | ............. | 711/104 |
| 6,980,944 B1 * | 12/2005 | Oshins et al. | ............... | 703/17 |
| 6,986,014 B2 * | 1/2006 | Qureshi et al. | ............. | 711/170 |
| 6,986,032 B2 * | 1/2006 | Qureshi et al. | ................ | 713/1 |
| 6,986,129 B2 * | 1/2006 | Arbouzov et al. | .......... | 717/146 |
| 6,990,576 B2 * | 1/2006 | Qureshi et al. | ................ | 713/2 |
| 7,017,034 B2 * | 3/2006 | Qureshi et al. | ................ | 713/1 |
| 7,017,035 B2 * | 3/2006 | Nalawadi et al. | .............. | 713/1 |
| 7,032,095 B2 * | 4/2006 | Stephan et al. | ............. | 711/202 |
| 7,055,048 B2 * | 5/2006 | Warwick et al. | ............ | 713/320 |

OTHER PUBLICATIONS

"JAVA!", Tim Richey, Chapters 1, 2, 6, 7, 13 and 14, Sep. 22, 1995.*
The Design and Evolution of C++, Bjarne Stroustrup, pp. 423-426, Mar. 9, 1994.*

(Continued)

*Primary Examiner*—Todd Ingberg

(57) ABSTRACT

A computer-implemented method for compiling ASL (ACPI Source Language) code into AML (ACPI machine language) code. The method includes accessing an ASL program. A preprocessor is executed to process the ASL program and to insert support for at least one non-native programming construct. The ASL program is then processed using an ASL compiler to compile the ASL program into a resulting AML program.

22 Claims, 4 Drawing Sheets

OTHER PUBLICATIONS

The Annotated C++ Reference Manual ANSI base Document, Margaret Ellis et al, pp. 341-385 and 397-399, Jun. 7, 1990.*
JAVA Primer Plus, Paul M. Tyma et al, pp. 256-257, Mar. 6, 1996.*

A Programmable Preprocessor for Parallelizing Fortran 90, 1999, Matt Rosing et al, ACM, 19 pages.*

* cited by examiner

ACPI PREPROCESSOR

TECHNICAL FIELD

The present invention pertains to the field of digital computer systems. More particularly, the present invention relates to automatic power management and system configuration as implemented in digital computer systems.

BACKGROUND ART

The ACPI (Advanced Configuration and Power Interface) specification is an industry standard that combines various methods of power management with various components of "plug and play" functionality for different types of computer systems (e.g., notebooks, desktops, servers, etc.). ACPI is widely supported, with support typically built directly into the operating system. ACPI defines hardware and software interfaces used by the operating system to manipulate the characteristics of system devices (e.g., motherboard devices, low level interfaces, etc.). The specification is intended to be cross platform, wherein the interfaces can be ported to the different hardware configurations of various different hardware platforms (e.g., x86, Itanium, PowerPC, SPARC, etc.). The BIOS/firmware functions by abstracting the specific hardware configuration of a given platform in accordance with the ACPI definitions.

Generally, the ACPI support code provided by the BIOS/firmware is not written in the native assembly language of the platform, but rather in AML (ACPI Machine Language). Except for the few operations performed by an ACPI compliant BIOS/firmware, almost all ACPI operations are performed in the operating system context through the use of an interpreter. The interpreter functions by interpreting machine-independent ACPI Machine Language (AML) byte-code stored in ACPI tables.

AML is usually compiled from human-readable ACPI Source Language (ASL). ACPI Machine Language (AML) is byte-code that the interpreter in the OS context interprets. ACPI Source Language (ASL) is the programming language equivalent for AML. ASL is compiled into AML images. Typically, a hardware vendor writes ASL code and provides the compiled AML code for its hardware in the Definition Blocks of the ACPI System Description Tables of the hardware. At boot time, the BIOS/firmware of the computer system accesses these tables in order to discover the ACPI capabilities of its specific hardware platform.

The industry relies upon a relatively small number of well-known and widely distributed tools for writing ASL and compiling ASL into AML for BIOS/firmware. For example, for x86 based machines and Itanium/IA64 machines, Intel provides tools for interpretation, assembly and disassembly of AML. For Windows-based machines, Microsoft provides the relevant ASUAML tools. Similarly, the AML interpreter in the Linux kernel is implemented in the ACPI4Linux project. Each of these toolsets provides a compiler that compiles ASL modules and routines into corresponding AML code.

A problem exists however, in fact that the well-known, widely used ASL compilers are relatively primitive in comparison to other programming tools for other languages (e.g., C, C++, Java, etc.). There currently exists no support for a number of higher level constructs which are widely implemented in compilers for higher level languages. For example, there is no support in ACPI for object names longer than four characters, and no support for sharing C header files between ACPI and system firmware. There currently exists no support for embedded ASL code that "morphs" at compile time in accordance with certain platform variances, and no support for the inclusion within ASL routines anything that is not an ASL file.

Lack of support for these higher-level constructs renders ASL code much harder to maintain, debug, and develop. The lack of support for these higher level constructs consequently makes ASL files much less reusable, much less portable, and much less shareable, in comparison to other programming languages. These drawbacks make development in ASL expensive and time consuming.

Thus, what is required is a solution that implements high level constructs for ASL development while retaining compatibility with widely supported ASL tools.

DISCLOSURE OF THE INVENTION

A method and computer readable medium for compiling ASL (ACPI Source Language) code into AML (ACPI machine language) code is disclosed. In one embodiment, the present invention is a computer implemented method for compiling ASL code into AML code. The method includes accessing an ASL program. A preprocessor is executed to process the ASL program and to insert support for at least one non-native programming construct. The ASL program is then processed using an ASL compiler to compile the ASL program into a resulting AML program.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODES FOR CARRYING OUT THE INVENTION

Embodiments of the present invention are directed towards a computer implemented method and system for using a preprocessor to improve the process of compiling ASL (ACPI Source Language) code into AML (ACPI machine language) code. In one embodiment, the preprocessor is configured to access an ASL program. The preprocessor processes the ASL program and inserts support for one or more non-native programming constructs. These programming constructs provide an added amount of functionality that cannot be obtained through the use of conventional ASL compilers. The non-native constructs are specifically configured by the preprocessor to function within the constraints of a typical industry standard ASL compiler. The resulting ASL program produced by the preprocessor is then processed using an ASL compiler to compile the ASL program into a resulting AML program. For example, the non-native programming constructs included in the ASL program are tolerated by the ASL compiler during its compile process. The resulting AML program produced by the ASL compiler will reflect the settings, instructions, special features, or the like, specified by the non-native constructs. Depending on the type of added functionality desired by, for example, a software developer, the non-native constructs can be configured to add support for object names having more than four characters, shared C header files, code "morphing" depending upon the target platform variance, Zeta-string variables, and the like. As used herein, the term non-native refers to code that is not generally intended for use with standard ASL compilers.

In this manner, an ACPI preprocessor in accordance with embodiments of the present invention provides robust support for many types of high level programming constructs that are otherwise unavailable to an ASL software programmer. Access to these high level programming constructs provide a number of advantages. For example, the high level programming constructs make ASL code developed in accordance with embodiments of the present invention much easier to maintain, debug, and develop in comparison to the prior art. Additionally, ASL files developed in accordance with embodiments of the present invention are much more reusable, much more portable across different platforms, and much more shareable, in comparison to the prior art. Importantly, these benefits are provided while maintaining compatibility with widely supported ASL tools, such as, for example, ASL compilers provided by Intel and Microsoft.

Figure 1:
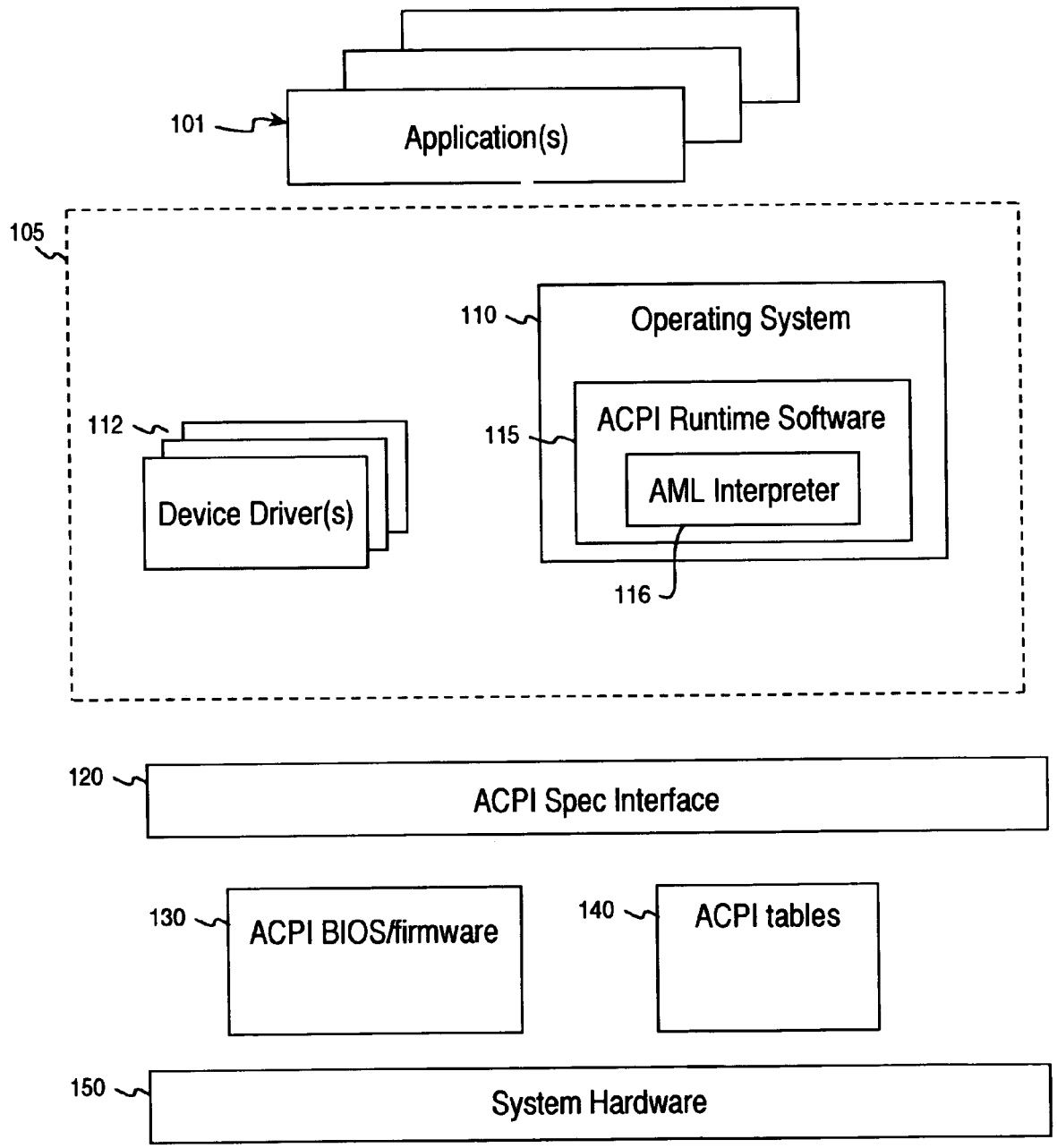
FIG. 1 shows a block diagram of the operating environment of a computer system in accordance with one embodiment of the present invention.

FIG. 1 shows a block diagram of the operating environment of a computer system 100 in accordance with one embodiment of the present invention. As depicted in FIG. 1, system 100 shows the basic components involved in the operation of an ACPI compliant computer system (e.g., computer system 400 of FIG. 4).

In the system 100 embodiment, one or more applications 101 execute on the computer system platform. As depicted in FIG. 1, the applications 101 execute on top of an operating system context 105 that includes the operating system 110 and one or more device drivers 112. In the system 100 embodiment, the operating system 110 includes ACPI run-time software 115 that functions by implementing the ACPI functionality from the operating system side. The ACPI run-time software 115 includes an AML interpreter 116.

The operating system context 105 (e.g., operating system 110, device drivers 112, etc.) interfaces with the system hardware 150 through an ACPI specification defined interface 120.

Within the operating system context 105, the operating system 110 utilizes the ACPI runtime software 110 and drivers 112 to communicate with APCI components (e.g., the ACPI BIOS/firmware 130 and the ACPI tables 140) in addition to the usual computer system device framework used to manage non-ACPI devices that may be coupled to the system 100.

The specification interface 120 functions as the interface layer between the ACPI BIOS/firmware 130 and the ACPI tables 140 of the computer system. The ACPI BIOS/firmware 130 and the ACPI tables 140 provide the software functionality for directly interacting with the system hardware 150 (e.g., motherboard devices, peripheral devices, etc.).

Referring still FIG. 1, the ACPI tables 140 comprise one of the central data structures of an ACPI-based system. The ACPI tables 140 contain, for example, definition blocks that describe the hardware that can be managed through ACPI. These definition blocks include both data and machine-independent byte-code that is used to perform hardware management operations.

The ACPI BIOS/firmware 130 comprises low-level software routines that perform basic low-level management operations on the computer system's hardware. These operations include, for example, code to help boot the system and to put the system to sleep or wake it up. In x86 based computer systems, such code is typically referred to as BIOS code. In more modern workstations (e.g., IA64 based systems, etc.), the code is typically referred to as firmware.

When the computer system 100 is powered up, the ACPI BIOS/firmware 130 builds the initial ACPI tables 140 in memory before the operating system 110 is loaded. When the ACPI-aware operating system kernel 110 is started, it accesses the ACPI tables 140 and uses the information stored therein to discover the ACPI compliant hardware characteristics.

As known by those skilled in the art, the definition blocks within the ACPI tables 140 are stored in a hierarchical tree-based name space. Each node in the tree is named. Node names consist of four alphanumeric characters. For example, nodes in the _SB namespace refer to busses and devices attached to the main system bus, nodes in the _TZ namespace relate to thermal management, and nodes in _GPE are associated with general purpose ACPI events. In this manner, the ACPI namespace enumerates a tree of devices attached to the system. The operating system 110 "walks" this tree to enumerate devices and gain access to the device's data and control methods.

Referring still to FIG. 1, generally, most ACPI operations are performed in the operating system context 105 through the use of an AML interpreter 116 interpreting machine-independent ACPI Machine Language (AML) byte-code stored in the ACPI tables 140. These blocks of AML are called methods. AML methods are stored in specially named nodes in the ACPI namespace. As known by those skilled in the art, AML is usually compiled from human-readable ACPI Source Language (ASL).

The operating system 110 communicates with the ACPI system hardware 150 using the ACPI tables 140. The AML byte-code within the tables 140 describe the interfaces to the system hardware 150 and provide an abstract interface for controlling the power management and configuration of the overall computer system 100. This enables the operating system 110 to control system features without needing to know how the system controls are implemented.

Within the ACPI tables 140 is a main table called the Root System Description Table (RSDT), which references other description tables which specify the system's implementation and configuration. One table the RSDT points to is the Fixed ACPI Description Table (FADT) that contains entries describing the fixed features of the ACPI hardware. And another table present in the RSDT is the Differentiated System Description Table (DSDT). This table contains information and descriptions for various system features.

Figure 2:
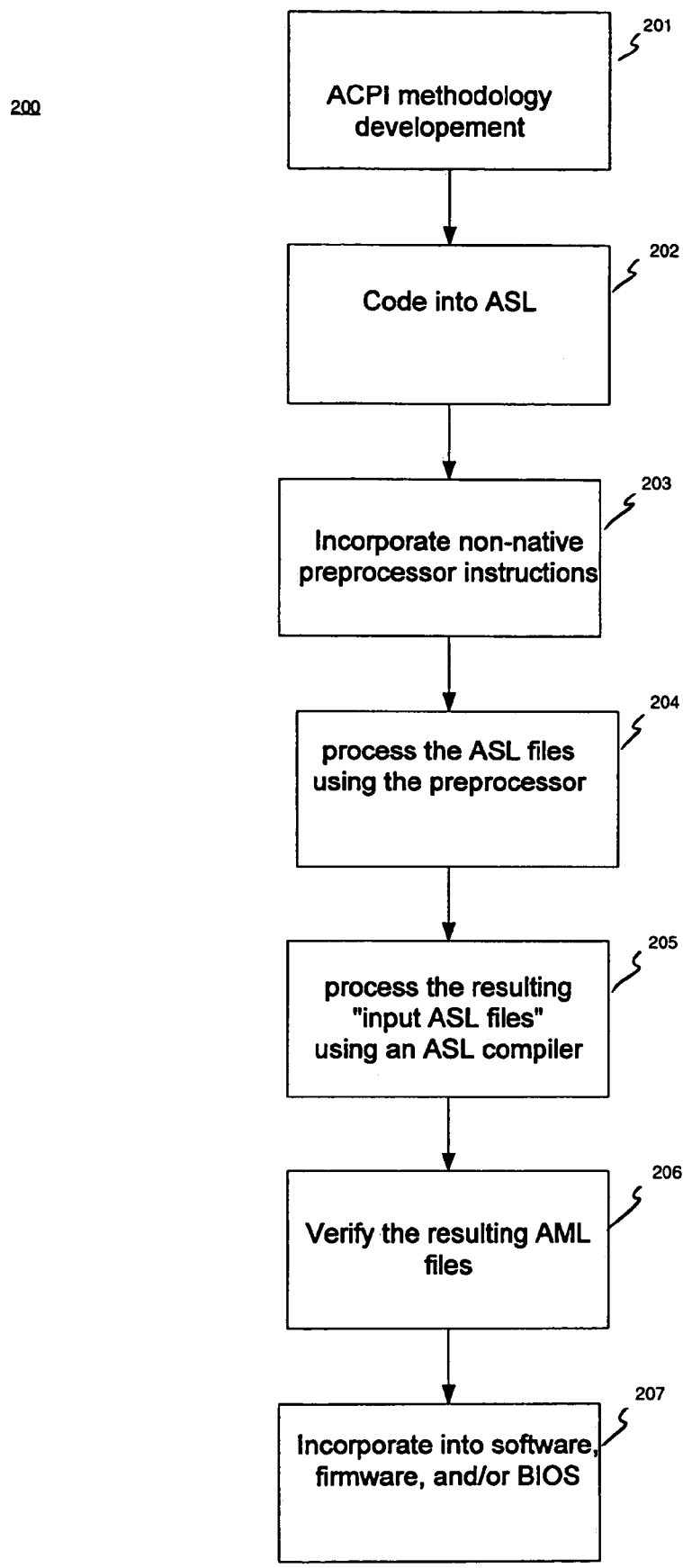
FIG. 2 shows a flowchart of the steps of a process for using an ACPI preprocessor in accordance with one embodiment of the present invention.

FIG. 2 shows a flowchart of the steps of a process 200 for using an ACPI preprocessor in accordance with one embodiment of the present invention. As depicted in FIG. 2, process 200 shows one example of the basic operating steps involved in developing an ACPI program for a computer system using an ACPI preprocessor.

Process 200 begins in step 201, where an ACPI development methodology is begun. The different power saving schemes available to a given computer system manufacturer are chosen and the manner in which such schemes are invoked are decided upon during the basic development stage. Additionally, the one or more target platforms for the software development are also chosen.

In step 202, the ACPI routines are coded using ASL. As described above, ACPI programs are written by software developers using ASL. The ASL comprises the human readable code that is subsequently compiled into machine-readable AML code. As described above, AML (ACPI Machine Language) is pseudo code for an interpreter (e.g., the interpreter 116 of FIG. 1) that the OS (e.g., operating system 110) runs. The ACPI routines can be written from scratch or, as is usually the case, adapted (e.g., ported) from an existing implementation.

In step 203, in accordance with embodiments of the present invention, non-native preprocessor instructions are included within the ASL coded routines. In accordance with embodiments of the present invention, the non-native preprocessor instructions comprise non-native programming constructs that provide an added amount of functionality that cannot be obtained through the use of conventional ASL compilers. Depending on the type of added functionality desired by the software developer, the non-native constructs can be configured to add support for object names having more than four characters, shared C header files, code "morphing" depending upon the target platform variance, Zeta-string variables, and the like.

In step 204, the ASL files including the non-native preprocessor instructions are processed by the preprocessor. The non-native preprocessor instructions comprise non-native constructs that configure the preprocessor to process the ASL files in specific manners (e.g., to provide support for object names having more than four characters, shared C header files, code morphing, and the like). The output of the preprocessor is one or more resulting ASL input files for an ASL compiler.

In step 205, the resulting ASL input files are processed using an ASL compiler. The non-native constructs included in the ASL input files are specifically configured by the preprocessor to function within the constraints of a typical industry standard ASL compiler. Thus, the constructs are "non-native" due to the fact that without the features provided by the preprocessor, the ASL compiler would not properly compile the ASL input files. For example, an industry standard ASL compiler would simply fail when it encountered a non-standard ASL construct.

However, because of the specific manner in which the non-native constructs are included within the ASL program, the non-native programming constructs are tolerated by the ASL compiler during its compile process. The resulting AML program produced by the ASL compiler will reflect the settings, instructions, special features, or the like, specified by the non-native constructs. In this manner, the input ASL files are compiled into AML images for burning into the hardware.

In step 206, the AML files are tested to verify their functionality. Subsequently, in step 207, the AML files are incorporated into software, firmware, and/or BIOS of the target computer system.

Figure 3:
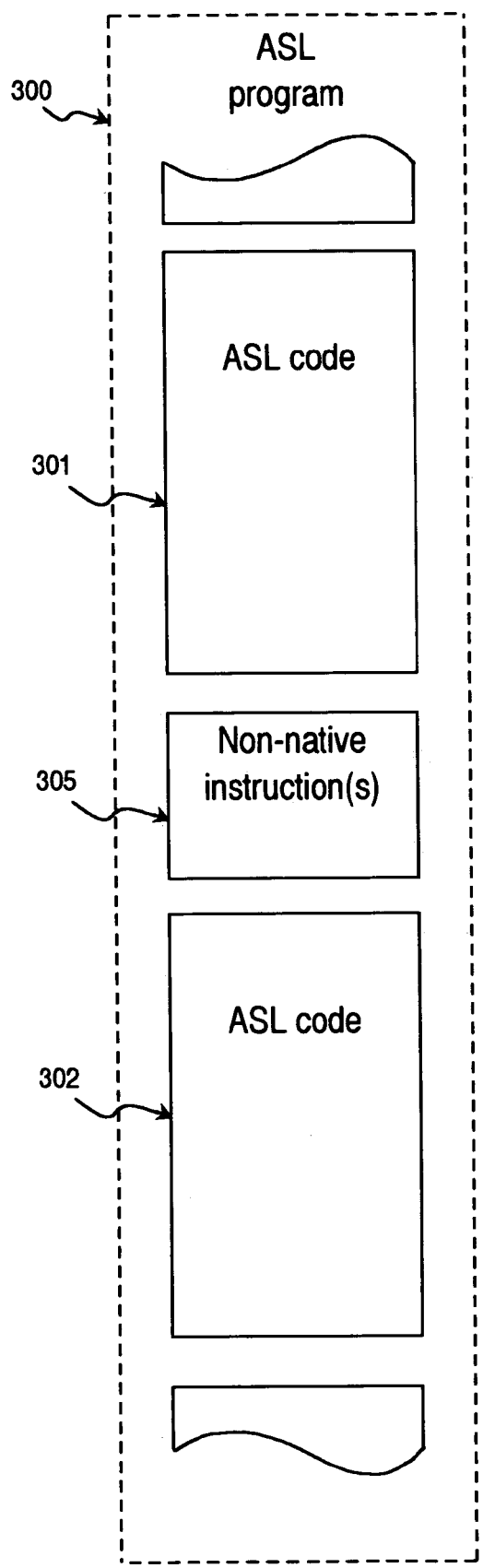
FIG. 3 shows a block diagram of a portion of an ASL program in accordance with one embodiment of the present invention.

FIG. 3 shows a block diagram of a portion of an ASL program 300 in accordance with one embodiment of the present invention. As shown in FIG. 3, the ASL program 300 includes an ASL code block 301, a non-native instruction block 305, and an ASL code block 302.

Embodiments of the present invention utilize incorporated non-native instructions (e.g., non-native instruction block 305) within an ASL program to provide support for high-level programming constructs that are not native to ASL. This feature is visually depicted in FIG. 3. As described above, industry standard ASL compilers will fail if they encounter non-ASL instructions or constructs. In accordance with embodiments of the present invention, however, the non-native instructions 305 are incorporated in such a way that they will not cause faults or compile failures when operated on by the widely used ASL compilers.

In one embodiment, the non-ASL syntax of the non-native instructions 305 is "hidden" within ASL comments. As known by those skilled in the art, certain markers within ASL instruct the ASL compiler to disregard the enclosed ASCII characters as "comments" that are not meant to be compiled into machine language. However, theses characters can be recognized by the preprocessor as instructions for the preprocessor. Thus, the non-native instructions 305 can be enclosed within comment markers to ensure the non-native instructions 305 do not interfere with the compilation of the ASL program 300 by an industry standard ASL compiler. The preprocessor however, can be configured to recognize and process the non-native instructions 305 irrespective of any comment markers.

The benefits provided by the inclusion of the non-native instructions 305 are now described. It should be noted that the inclusion of the non-native instructions for use with an ACPI preprocessor in the manner described above can be configured to provide any one of the benefits described below, two or more of the benefits, or all of them. For example, the specific configuration of the added non-native instructions can be customized to provide the needed functionality as efficiently as possible (e.g., provide the desired benefit with a minimum of added code). Additionally, a flexibility aspect of the ACPI preprocessor embodiments allow future functionality to be incorporated into ASL programs through preprocessor modifications. For example, support for some future standard of programming construct can be added to future ASL development methodologies by modifying/updating a preprocessor embodiment of the present invention.

In one embodiment, the non-native instructions 305 are configured to provide mechanisms for enabling object names that are longer than four characters. In such an embodiment, for example, the non-native instructions 305 can include table data structures that provide a mapping between readily recognizable object names of arbitrary length (e.g., greater than four characters) and the ASL standard object names (e.g., four characters or less). By enabling the use of object names that are longer than four characters, the resulting ASL program 300 is much easier to maintain since the objects can be given readily recognizable names as opposed to, for example, comparatively obscure four character acronyms. For example, primary and secondary PCI buses can simply be named "primary PCI bus" and "secondary PCI bus" as opposed to, for example, "PPCI" and "SPCI" respectively.

In one embodiment, the non-native instructions 305 provide support for the inclusion of C header files within the ASL program 300. Because of the configuration of the non-native instructions 305, the inclusion of C header files can be implemented in such a manner that they can be recognized and operated on by the preprocessor and be ignored by the ASL compiler.

In one embodiment, the non-native instruction 305 can provide support for the sharing of C header files between the system's ACPI software components and the system's BIOS/firmware components. As known by those skilled in the art, standard ASL does not support shared C header files. The use of the non-native instructions 305, in conjunction with the preprocessor, enable a software developer to write an ASL program that takes advantage of shared C header files. Shared C header files reduce the amount of development work required in ensuring that the ASL program 300 and the BIOS/firmware have the correct constants/values. For example, in the prior art, a change in system BIOS/firmware would involve work from two developers (e.g., the ACPI developer writing in ASL and the BIOS/firmware developer writing in C), as opposed to in the present embodiment, where a change to C header files (e.g., the non-native instructions 305) is shared.

Another benefit provided by the non-native instructions 305 in accordance with one embodiment involves support for preprocessing of ASL code to take advantage of directives that account for computer system platform variants. The non-native instructions 305 can be configured to support directives such as, for example, #ifndef, etc., that function by embedding software code within the program 300 that "morphs", or changes, at build time. Such functionality can be used to build a program 300 having support for a number of different variants of a computer system platform. For example, depending upon the hardware configuration of a given computer system platform (e.g., multiprocessor vs. single processor, installed memory, bus size, number of peripheral devices, etc.), the directives embodied in the non-native instructions 305 can cause the ASL program 300 to change at build time in accordance with the specifics of the given platform. In contrast, in the prior art, each variant of a computer system platform typically required a custom written ASL program specific to that platform.

Another benefit provided by the non-native instructions 305 in accordance with one embodiment involves support for specialized string variables. For example, the non-native instructions 305 can comprise specialized "Zeta-strings" that are special double quoted strings that start with a character 'Zeta' where Zeta can be any character or characters that hold a special meaning for the given ACPI preprocessor. The significance of such strings is that a developer, in conjunction with the functionality of the preprocessor of the present embodiment, can request the preprocessor to place the contents of the Zeta-string into the ASL program 300 at a given location without the character(s) Zeta and the double quotes.

Thus, the above benefits provided by an ACPI preprocessor in accordance with embodiments of the present invention provide a number of high-level programming constructs that would otherwise be unavailable to ACPI developers. Such benefits make the ASL code much easier to maintain, debug, and develop in comparison to the prior art. Additional benefits include the generation of code that is more reusable, much more portable across different platforms, and much more shareable, while maintaining compatibility with widely supported ASL tools.

Computer System Platform

Figure 4:
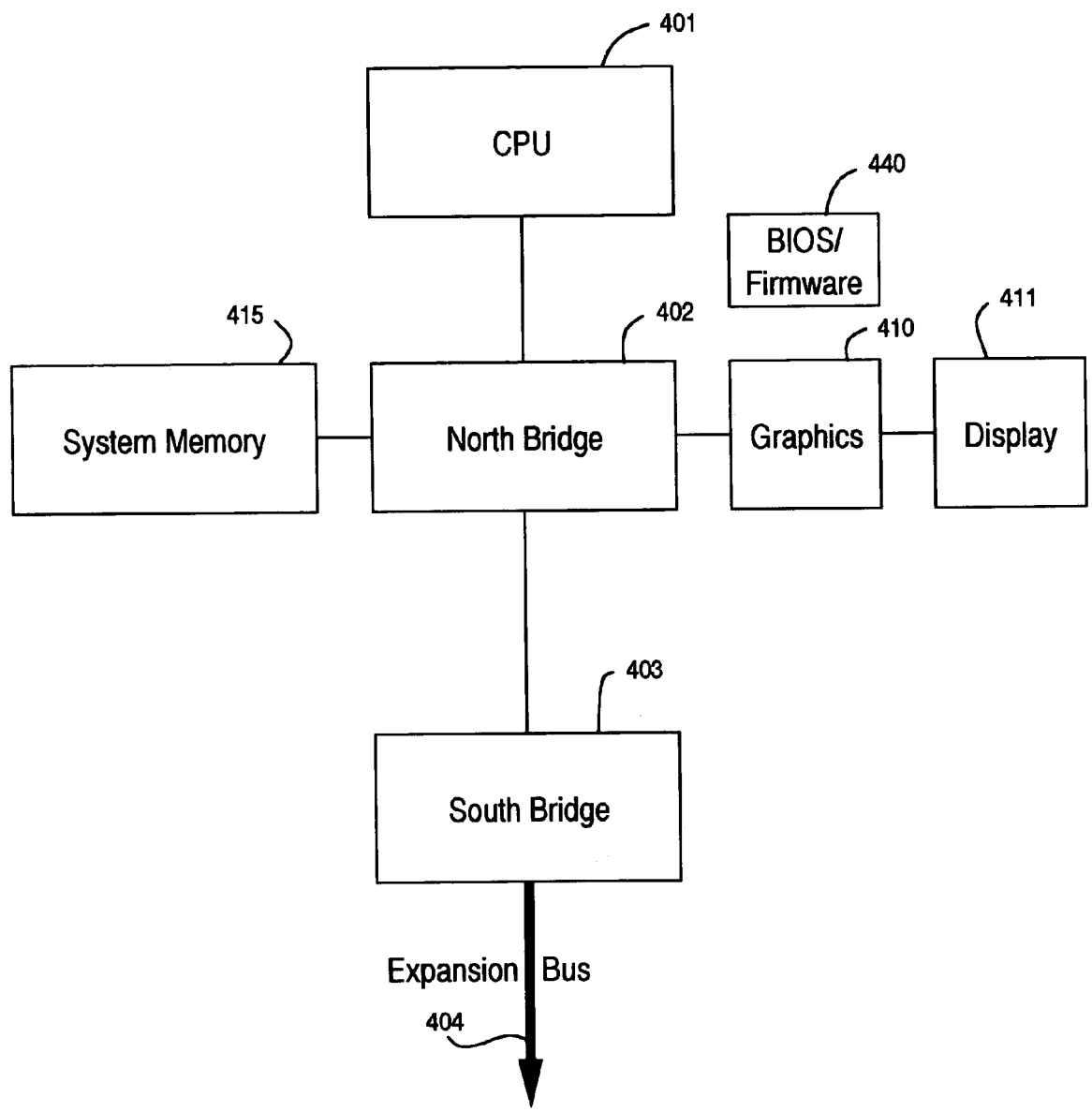
FIG. 4 shows a computer system in accordance with one embodiment of the present invention.

With reference now to FIG. 4, a computer system 400 in accordance with one embodiment of the present invention is shown. Computer system 400 shows the general components of a computer system in accordance with one embodiment of the present invention that provides the execution platform for implementing certain software-based functionality of the present invention. The system 400 can be used to implement a server computer system, a desktop computer system, a portable computer system, or the like, as required by the circumstances of a given application. As described above, certain processes and steps of the present invention are realized, in one embodiment, as a series of instructions (e.g., software code) that reside within computer readable memory of a computer system (e.g., system 400) and are executed by the computer system's CPU (e.g., CPU 401). When executed, the instructions cause the computer system to implement the functionality of the present invention as described above.

In general, system 400 comprises at least one CPU 401 coupled to a North bridge 402 and a South bridge 403. The North bridge 402 provides access to system memory 415 and an optional graphics unit 410 that drives an optional display 411. The South bridge 403 provides access to at least one expansion bus 404 (e.g., a PCI bus, SCSI bus, 1394, Ethernet, etc.) as shown. Computer system 400 also shows a BIOS/firmware unit 440 (e.g., a flash ROM) that stores initialization software.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer-implemented method for compiling ASL (ACPI Source Language) code into AML (ACPI machine language) code, comprising:
   accessing an ASL program;
   executing a preprocessor to process the ASL program and to insert support for at least one non-native programming construct; and
   processing the ASL program using an ASL compiler to compile the ASL program into a resulting AML program.

2. The computer implemented method of claim 1, wherein the non-native programming construct is included in the ASL program and is tolerated by the ASL compiler during the compile of the ASL program into the resulting AML program.

3. The computer implemented method of claim 1, wherein the non-native programming construct comprises object names having more than four characters.

4. The computer implemented method of claim 1, wherein the non-native programming construct comprises at least one shared C header file configured for sharing between the ASL program and a firmware program.

5. The computer implemented method of claim 1, wherein the non-native programming construct comprises code configured to change at compile-time to support a platform variance.

6. The computer implemented method of claim 1, wherein the non-native programming construct comprises at least one C header file.

7. The computer implemented method of claim 1, wherein the non-native programming construct comprises a Zeta-string variable.

8. A compiling method for compiling ASL (ACPI Source Language) code into AML (ACPI machine language) code, comprising:
   accessing an ASL program;
   executing a preprocessor to process the ASL program and to insert support for at least one non-native programming construct;

generating an input ASL program by using the preprocessor, the input ASL program generated in accordance with the ASL program and the at least one non-native programming construct; and processing the input ASL program using an ASL compiler to compile the input ASL program into a resulting AML program.

9. The compiling method of claim 8 wherein the preprocessor generates the input ASL program in accordance with preprocessor instructions contained within the non-native programming construct.

10. The compiling method of claim 9 wherein the generation of the input ASL program by the preprocessor is controlled by conditions specified by the instructions.

11. The compiling method of claim 10 wherein the processing of the input ASL program by the ASL compiler yields the resulting AML program that functions in accordance with the conditions specified by the instructions.

12. The compiling method of claim 11, wherein the non-native programming construct comprises object names having more than four characters.

13. The compiling method of claim 11, wherein the non-native programming construct comprises at least one shared C header file configured for sharing between the ASL program and a firmware program.

14. The compiling method of claim 11, wherein the non-native programming construct comprises code configured to change at compile-time to support a platform variance.

15. The compiling method of claim 11, wherein the non-native programming construct comprises at least one C header file.

16. The compiling method of claim 11, wherein the non-native programming construct comprises a Zeta-string variable.

17. A computer-readable medium embodying instructions that cause a computer system to perform a method for compiling ASL (ACPI Source Language) code into AML (ACPI machine language) code, said method comprising: accessing an ASL program; executing a preprocessor to process the ASL program and to insert support for at least one non-native programming construct; and processing the ASL program using an ASL compiler to compile the ASL program into a resulting AML program tangibly embodied on a computer readable medium.

18. The computer-readable medium of claim 17, wherein the non-native programming construct is included in the ASL program and is tolerated by the ASL compiler during the compile of the ASL program into the resulting AML program.

19. The computer-readable medium of claim 17, wherein the preprocessor generates the ASL program in accordance with preprocessor instructions contained within the non-native programming construct.

20. The computer-readable medium of claim 19, wherein the generation of the ASL program by the preprocessor is controlled by conditions specified by the instructions.

21. A system for compiling ASL (ACPI Source Language) code into AML (ACPI machine language) code, comprising: means for accessing an ASL program; means for executing a preprocessor to process the ASL program and to insert support for at least one non-native programming construct; and means for processing the ASL program using an ASL compiler to compile the ASL program into a resulting AML program tangibly embodied on a computer readable medium.

22. The system of claim 21, wherein the non-native programming construct is included in the ASL program and is tolerated by the ASL compiler during the compile of the ASL program into the resulting AML program.

* * * * *

UNITED STATES PATENT AND TRADEMARK OFFICE
CERTIFICATE OF CORRECTION

| | | |
|---|---|---|
| PATENT NO. | : 7,188,339 B2 | Page 1 of 1 |
| APPLICATION NO. | : 10/693510 | |
| DATED | : March 6, 2007 | |
| INVENTOR(S) | : Shiraz Ali Qureshi | |

It is certified that error appears in the above-identified patent and that said Letters Patent is hereby corrected as shown below:

In column 1, line 54, delete "ASUAML" and insert -- ASL/AML --, therefor.

Signed and Sealed this

Twenty-second Day of December, 2009

David J. Kappos
*Director of the United States Patent and Trademark Office*